United States Patent Office 3,287,400
Patented Nov. 22, 1966

3,287,400
PROCESS FOR PREPARING 2,2-DIALKYL-OMEGA-FORMYL ALCOHOLS AND THEIR ESTERS
Hugh J. Hagemeyer, Jr., David C. Hull, and Milton A. Perry, Longview, Tex., assignors to Eastman Kodak Company, Rochester, N.Y., a corporation of New Jersey
No Drawing. Filed July 16, 1963, Ser. No. 295,511
7 Claims. (Cl. 260—491)

This invention relates to organic chemistry. More particularly, this invention relates to a novel process for the omega hydroformylation of ethylenically unsaturated 2,2-dialkyl alcohols and their esters and to the resulting novel 2,2-dialkyl-omega-formyl alcohols and their esters.

The 2,2-dialkyl-omega-formyl alcohols and esters prepared by the novel process of the invention can be oxidized to form hydroxy acids or dicarboxylic acids which are useful in the preparation of valuable plasticizers, linear polyesters, polyamides, grease additives, etc.

We have discovered that ethylenically unsaturated 2,2-dialkyl alcohols and their esters having the formula:

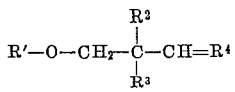

combine with carbon monoxide and hydrogen in the presence of a hydroformylation catalyst at elevated temperatures and pressures to yield unexpectedly formylation products having the formyl group exclusively in the omega position. The omega formylation products have the general formula:

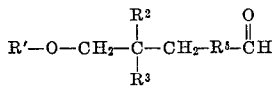

In the above formula, $R^1$ is a hydrogen atom or an acyl group having up to about 8 carbon atoms; each of $R^2$ and $R^3$ is an alkyl group having from 1 to about 8 carbon atoms; $R^4$ is an alkylidene group having from 2 to about 8 carbon atoms and $R^5$ is an alkylene group having from 2 to about 8 carbon atoms.

$R^1$ is preferably a hydrogen atom or an acyl group of up to about 5 carbon atoms. Typical of the preferred acyl groups are formyl, acetyl, propionyl, butyryl, isobutyryl, etc., $R^3$ and $R^4$ are preferably lower alkyl groups, i.e., alkyl groups of 1 to about 4 carbon atoms such as methyl, ethyl, propyl, isopropyl, butyl, isobutyl, etc.

The substituent $R^4$ is preferably an alkylidene group of 2 to about 4 carbon atoms such as ethylidene, propylidene, isopropylidine, butylidene, isobutylidene, etc. $R^5$ is preferably an alkylene group of 2 to about 4 carbon atoms such as ethylene; 1,3-propylene; 1,2-propylene; 1,4-butylene; 1,3-butylene; 1,2-butylene, etc.

Examples of the ethylenically unsaturated 2,2-dialkyl alcohols and esters which are useful in the practice of the invention are alcohols such as 2,2-dimethyl-3-pentene-1-ol; 2,2,4-trimethyl-3-pentene-1-ol; 2-ethyl-2-methyl-3-pentene - 1 - ol; 2 - ethyl-2,4-dimethyl-3-pentene-1-ol; 2,2,5-trimethyl-3-hexene-1-ol; 2 - ethyl - 2,4 - dimethyl - 3-hexene - 1 - ol; 2,2-dimethyl-3-hexene-1-ol; and esters of such alcohols with acids such as formic acid, acetic acid, propionic acid, butyric acid, isobutyric acid, valeric acid, isovaleric acid, etc.

The unsaturated 2,2-dialkyl alcohols and esters which are useful in the practice of the invention can be prepared by the pyrolysis of a 2,2-dialkyl-1,3-diol diester at elevated temperature in the manner of U.S. Patent No. 2,941,011. For example, 2-ethyl-2,4-dimethyl-3-hexene-1-ol isovalerate is readily prepared by the pyrolysis of 2-ethyl - 2,4 - dimethylhexane - 1,3-diol diisovalerate at about 500° C.

The process of the invention is carried out by contacting the selected unsaturated alcohol or ester with hydrogen and carbon monoxide in the presence of a hydroformylation catalyst at a temperature of about 50° C. to about 250° C. and a pressure such that the combined partial pressure of the carbon monoxide and hydrogen is about 40 atmospheres to about 700 atmospheres. Because of the relatively low vapor pressure of the ethylenically unsaturated 2,2-dialkyl alcohols and esters, the above pressure is substantially equal to the total reaction pressure.

Preferred hydroformylation catalysts for use in the process of the invention are those containing cobalt. However, other carbonyl forming materials, or mixtures thereof with a cobalt containing catalyst can be employed.

One suitable cobalt-containing catalyst is 36% cobalt suspended or deposited on an inert carrier as filtercel, diatomaceous earth or kieselguhr. Suitable cobalt-containing catalysts are those containing 30–40% cobalt on silica gel; cobalt thoria or cobalt-thoria-magnesia on filtercel; and soluble cobalt catalysts such as cobalt tetracarbonyl, cobalt carbonyl hydride, dimeric cobalt tetracarbonyl, cobalt tricarbonyl and cobalt carbonyl butanol.

In a preferred embodiment of the process of the invention, we employ the catalyst in a diluent, for example in the ratio of 1:1 to 5:1 parts by volume. Hydroxy diluents such as butanol are preferred although carbonyl and other diluents can be used. The use of a diluent for the catalyst is preferred because of the higher yields obtained when the diluent is used. Alternatively, the hydroformylation of the unsaturated ester or alcohol can be carried out in the presence of diluent water which suppresses condensation involving the aldehyde linkage.

The process of the invention is preferably carried out by continuously contacting the catalyst with the selected unsaturated alcohol or ester and carbon monoxide and hydrogen. However, the reaction can be conducted in a batchwise fashion in an autoclave of suitable size.

The reaction is preferably carried out at a temperature of about 130° C. to about 180° C. and a pressure such that the combined partial pressure of hydrogen and carbon monoxide is about 100 atmospheres to about 300 atmospheres.

The carbon monoxide and hydrogen are conveniently employed in a 1:1 molar ratio. However, higher or lower proportions of either of the components can be used.

Typical of the novel omega formyl alcohols and esters obtained by the process of the invention are omega formyl alcohols such as 2,2-dimethyl-6-oxo hexanol; 2,2,4-trimethyl-6-oxo hexanol; 2-ethyl-2,4-dimethyl-6-oxo hexanol; 2,2,5-trimethyl-7-oxo heptanol; 2-ethyl-2-methyl-6-oxo hexanol; 2 - ethyl-2,4-dimethyl-7-oxo heptanol; 2,2-dimethyl-7-oxo heptanol and the esters of these alcohols with formic acid, acetic acid, propionic acid, butyric acid, isobutyric acid, valeric acid, isovaleric acid, etc.

The following examples illustrate the novel process and compounds of the invention.

*Example 1*

Three hundred five g. of 2,2,4-trimethyl-3-pentene-1-ol acetate is combined with an equimolar mixture of carbon monoxide and hydrogen at 150° C. and 200 atmospheres using 30 g. of a cobalt catalyst. The catalyst is 36% cobalt, 2% thoria, 2% magnesia on filtercel and 60% reduced. After the theoretical quantity of carbon monoxide and hydrogen has reacted, the autoclave is cooled, depressurized and the product is removed, filtered and treated with 500 ml. of 1% sulfuric acid to break down the metal carbonyls. The organic layer is extracted with ether and dried. Distillation of the product at reduced pressure gives 280 g. of 2,2,4-trimethyl-6-oxohexanol acetate which has a boiling point of 93–95° C. at 2.5 mm.

*Example 2*

One mole of 2,2,4-trimethyl-3-pentene-1-ol is combined with a mixture of carbon monoxide and hydrogen at about 135–155° C. and about 200 atmospheres in the presence of 30 g. of cobalt catalyst and 30 ccs. of water. When the hydroformylation is complete the organic mixture is steamed distilled away from the catalyst using 1% solution of sulfuric acid. The organic layer is then extracted with ether and dried. Distillation under reduced pressure gives 0.9 mole of 2,2,4-trimethyl-6-oxo hexanol as a mixture of a cyclic hemiacetal and the uncyclized monomer.

*Example 3*

Five hundred g. of 2,2,5-trimethyl-3-hexene-1-ol isobutyrate is combined with carbon monoxide and hydrogen at about 240 atmospheres using 30 g. of 40% cobalt oxide on Super Cel as a catalyst. The catalyst is activated prior to the reaction by reduction at 450° C. When no further pressure drop takes place, the autoclave is cooled, depressurized and the crude product is removed from the autoclave, filtered and steam distilled to separate the crude aldehyde from the catalyst. The crude aldehyde is dried and distilled at reduced pressure to give 580 g. of 2,2,5-trimethyl-7-oxo heptanol isobutyrate, which has a boiling point of 111° C. at 1.5 mm.

*Example 4*

Five hundred g. of 2-ethyl-2,4-dimethyl-3-hexene-1-ol isovalerate is combined with an equimolar mixture of carbon monoxide and hydrogen at about 155°–160° C. at about 240 atmospheres in the presence of 40 g. of partially reduced oxide catalyst on Super Cel and 30 ccs. of water. When the hydroformylation is complete, the autoclave is cooled, depressurized, and the organic mixture is removed from the autoclave and filtered to separate the insoluble portion of the catalyst. The crude aldehyde ester is then steam distilled from a 1% sulfuric acid solution. The organic layer is separated from the water, dried and distilled to yield 84% of approximately equimolar mixture of 2,4-diethyl-2-methyl-6-oxo hexanol isovalerate and 2-ethyl-2,4-dimethyl-7-oxo heptanol isovalerate, both of which are omega formylation products of 2-ethyl-2,4-dimethyl-3-hexene-1-ol isovalerate. The product boils at 135°–140° C. at 1.5 mm.

*Example 5*

Four hundred g. of 2,2-dimethyl-3-pentene-1-ol isobutyrate is combined with an equimolar mixture of carbon monoxide and hydrogen at about 165°–170° C. and about 240 atmospheres in the presence of 20 g. of reduced cobalt oxide catalyst and 30 ccs. of water. The hydro formylation is completed in approximately 45 min. and the autoclave is cooled, depressurized and the reaction mixture removed and filtered. The crude aldehyde product is then steam distilled from a 0.2% solution of sulfuric acid. The organic layer is washed with water, dried and distilled under reduced pressure to give 432 g. of 2,2-dimethyl-6-oxo hexanol isobutyrate which has a boiling point of 98° C. at 1.3 mm.

As previously stated the compounds of the invention are useful for preparing hydroxy acids and dicarboxylic acids which are useful in the preparation of plasticizers, linear polyesters, linear polyamides, grease additives, etc.

The hydroxy acids can be prepared from the compounds of the invention by oxidizing the formyl group of the corresponding 2,2-dialkyl-omega-formyl alcohol or ester. The oxidation can be carried out merely by passing an oxygen containing gas through the alcohol or ester until no more oxygen is taken up. Air is preferred as the oxygen containing gas because of its ready availability. The oxidation is conveniently carried out without the aid of a catalyst. However, conventional oxidation catalysts can be employed if desired. If a 2,2-dialkyl-omega-formyl alcohol ester is subjected to oxidation, the free hydroxy acid can be readily obtained by saponifying the oxidation product.

The dicarboxylic acids are readily obtained by oxidizing an hydroxy acid, produced by the procedure described above, with an alkali metal permanganate. Potassium permanganate is conveniently employed as the oxidizing agent. The desired dicarboxylic acid is readily recovered by filtering the reaction mixture, and acidifying the filtrate.

The following example illustrates the preparation of 6-hydroxy-3,5,5-dimethyl caproic acid which is useful in preparing 2,2,3-trimethyl adipic acid and in the preparation of polyesters, greases, specialty oil, etc. A well-known use for hydroxy acids is in the manufacture of greases wherein a lithium or other alkali metal base is reacted with the hydroxy acid to form a soap of the hydroxy acid which is particularly useful as a grease thickener.

*Example 6*

Forty g. of 2,2,4-trimethyl-6-oxo hexanol isobutyrate is blown with air at 40–50° C. until the off-gas gives no further indication of oxygen take-up. Distillation of the product gives 35 g. of 6-isobutyroxy-3,5,5-trimethylcaproic acid. The 6-isobutyroxy-3,5,5-trimethylcaproic acid is saponified, acidified and rectified to give 21 g. of 6-hydroxy-3,5,5-trimethylcaproic acid.

The preparation of 2,2,4-trimethyl adipic acid which is useful in the preparation of linear polyesters, polymeric plasticizers and linear polyamides is illustrated by the following example.

*Example 7*

One hundred g. of the 6-hydroxy-3,5,5-trimethylcaproic acid, prepared by the method of Example 6, is reacted with sodium hydroxide to form the sodium salt. A solution of alkali metal permanganate is added at 20° C. until the color of the permanganate persists. The reaction mixture is then filtered to remove the manganese dioxide, and then acidified. The product, 2,2,4-trimethyladipic acid, has a melting point of 102° C. after recrystallization from benzene.

The invention has been described in considerable detail with particular reference to certain preferred embodiments thereof, but it will be understood that variations and modification can be effected within the spirit and scope of the invention as described hereinbefore and as defined in the appended claims.

We claim:

1. The process of preparing an omega formyl compound of the formula:

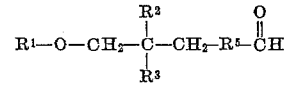

which comprises contacting a compound of the formula:

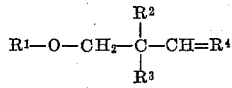

with hydrogen and carbon monoxide at elevated temperature and pressure in the presence of a hydroformylation catalyst; wherein $R^1$ is selected from the group consisting of hydrogen and an acyl group having up to about 8 carbon atoms; each of $R^2$ and $R^3$ is an alkyl group having 1 to about 8 carbon atoms; $R^4$ is an alkylidene group having 2 to about 8 carbon atoms and $R^5$ is an alkylene group having 2 to about 8 carbon atoms.

2. The process of preparing an omega formyl compound of the formula:

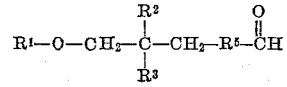

which comprises contacting a compound of the formula:

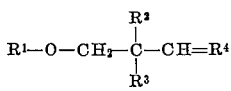

with hydrogen and carbon monoxide at a temperature of about 50° C. to about 250° C. and a combined hydrogen-carbon monoxide pressure of about 40 atmospheres to about 700 atmospheres in the presence of a cobalt containing hydroformylation catalyst; wherein $R^1$ is selected from the group consisting of hydrogen and an acyl group having up to about 8 carbon atoms; each of $R^2$ and $R^3$ is an alkyl group of 1 to about 8 carbon atoms; $R^4$ is an alkylidene group having 2 to about 8 carbon atoms and $R^5$ is an alkylene group having 2 to about 8 carbon atoms.

3. The process of preparing an omega formyl compound of the formula:

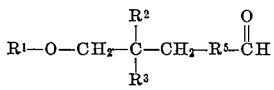

which comprises contacting a compound of the formula:

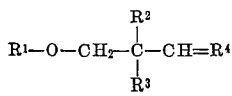

with a substantially equimolar mixture of hydrogen and carbon monoxide at a temperature of about 130° C. to about 180° C. and a hydrogen-carbon monoxide pressure of about 100 atmospheres to about 300 atmospheres in the presence of a cobalt containing hydroformylation catalyst; wherein $R^1$ is selected from the group consisting of hydrogen and an acyl group having up to about 5 carbon atoms; each of $R^2$ and $R^3$ is a lower alkyl group; $R^4$ is an alkylidene group having 2 to about 4 carbon atoms and $R^5$ is an alkylene group of 2 to about 4 carbon atoms.

4. The process of preparing omega formyl alcohols and esters thereof which comprises contacting a compound of the formula:

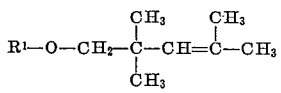

with a substantially equimolar mixture of hydrogen and carbon monoxide at a temperature of about 130° C. to about 180° C. and a hydrogen-carbon monoxide pressure of about 100 atmospheres to about 300 atmospheres in the presence of a cobalt containing hydroformylation catalyst; wherein $R^1$ is selected from the group consisting of hydrogen and an acyl group having up to about 8 carbon atoms.

5. The process of preparing omega formyl alcohols and esters thereof which comprises contacting a compound of the formula:

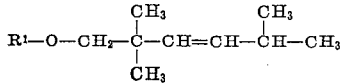

with a substantially equimolar mixture of hydrogen and carbon monoxide at a temperature of about 130° C. to about 180° C. and a hydrogen-carbon monoxide pressure of about 100 atmospheres to about 300 atmospheres in the presence of a cobalt containing hydroformylation catalyst; wherein $R^1$ is selected from the group consisting of hydrogen and an acyl group having up to about 8 carbon atoms.

6. The process of preparing omega formyl alcohols and esters thereof which comprises contacting a compound of the formula:

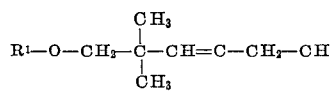

with a substantially equimolar mixture of hydrogen and carbon monoxide at a temperature of about 130° C. to about 180° C. and a hydrogen-carbon monoxide pressure of about 100 atmospheres to about 300 atmospheres in the presence of a cobalt containing hydroformylation catalyst; wherein $R^1$ is selected from the group consisting of hydrogen and an acyl group having up to about 8 carbon atoms.

7. The process of preparing omega formyl alcohols and esters thereof which comprises contacting a compound of the formula:

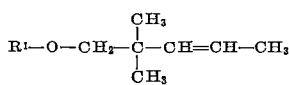

with a substantially equimolar mixture of hydrogen and carbon monoxide at a temperature of about 130° C. to about 180° C. and a hydrogen-carbon monoxide pressure of about 100 atmospheres to about 300 atmospheres in the presence of a cobalt containing hydroformylation catalyst; wherein $R^1$ is selected from the group consisting of hydrogen and an acyl group having up to about 8 carbon atoms.

References Cited by the Examiner
UNITED STATES PATENTS

| | | | |
|---|---|---|---|
| 2,820,055 | 1/1958 | Caldwell et al. | 260—491 |
| 2,831,029 | 4/1958 | Vergilio | 260—604 |
| 2,857,422 | 10/1958 | Fischer | 260—488 |

OTHER REFERENCES

Hughes, I. and E. C.: vol. 49, pp. 1999–2003 (1957).
Adkins et al.: J. Amer. Chem. Soc., vol. 71, 1949, pp. 3051–55.
Hoog: Proc. 3rd World Petrol. Congress, section V, pp. 1–21 (1951).

LORRAINE A. WEINBERGER, *Primary Examiner.*
LEON ZITVER, *Examiner.*
D. P. CLARKE, V. GARNER, *Assistant Examiners.*